(12) United States Patent
Ogawa

(10) Patent No.: US 9,041,983 B2
(45) Date of Patent: May 26, 2015

(54) FACSIMILE DEVICE PERFORMING OFF-HOOK IN PRESET SPECIFIED NUMBER OF RINGS WITHOUT RING APPARATUS

(71) Applicant: Kyocera Document Solutions Inc., Osaka (JP)

(72) Inventor: Shinya Ogawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/470,962

(22) Filed: Aug. 28, 2014

(65) Prior Publication Data

US 2015/0062665 A1 Mar. 5, 2015

(30) Foreign Application Priority Data

Aug. 28, 2013 (JP) ................................. 2013-176809
Aug. 28, 2013 (JP) ................................. 2013-176810
Aug. 28, 2013 (JP) ................................. 2013-176811

(51) Int. Cl.
*H04N 1/32* (2006.01)
*H04N 1/00* (2006.01)
*G06F 15/00* (2006.01)
*G06F 3/12* (2006.01)
*G06K 1/00* (2006.01)

(52) U.S. Cl.
CPC ....... *H04N 1/00896* (2013.01); *H04N 1/00037* (2013.01)

(58) Field of Classification Search
CPC ..................... H04N 1/00896; H04N 1/00037
USPC ................................ 358/468, 1.1, 1.15, 1.13
See application file for complete search history.

(56) References Cited

U.S. PATENT DOCUMENTS

2002/0175720 A1* 11/2002 Huang et al. .................. 327/113
2009/0289908 A1* 11/2009 Chen et al. ..................... 345/173

FOREIGN PATENT DOCUMENTS

| JP | 2001-309077 A | 11/2001 |
| JP | 2002-344657 A | 11/2002 |
| JP | 2005-086755 A | 3/2005 |
| JP | 2013-005037 A | 1/2013 |

* cited by examiner

*Primary Examiner* — Douglas Tran
(74) *Attorney, Agent, or Firm* — James W. Judge

(57) ABSTRACT

A facsimile device includes a main control unit and a sub-control unit. The first main control unit is configured to count a number of rings in a call signal sent from a public-line network and to put the facsimile device off-hook when the count value reaches a preset specified number of rings in the normal mode, and to suspend the count and off-hook functions in the energy-saving mode. The sub-control unit is configured to detect an incoming call signal and cause the main control unit to recover. The main control unit is configured to: calculate the number of rings in an incoming call signal in an elapsed time required from when the sub-control unit detects the incoming call signal until the main control unit recovers to the normal mode; and use the calculated number of rings to count the number of rings in an incoming call signal.

14 Claims, 12 Drawing Sheets

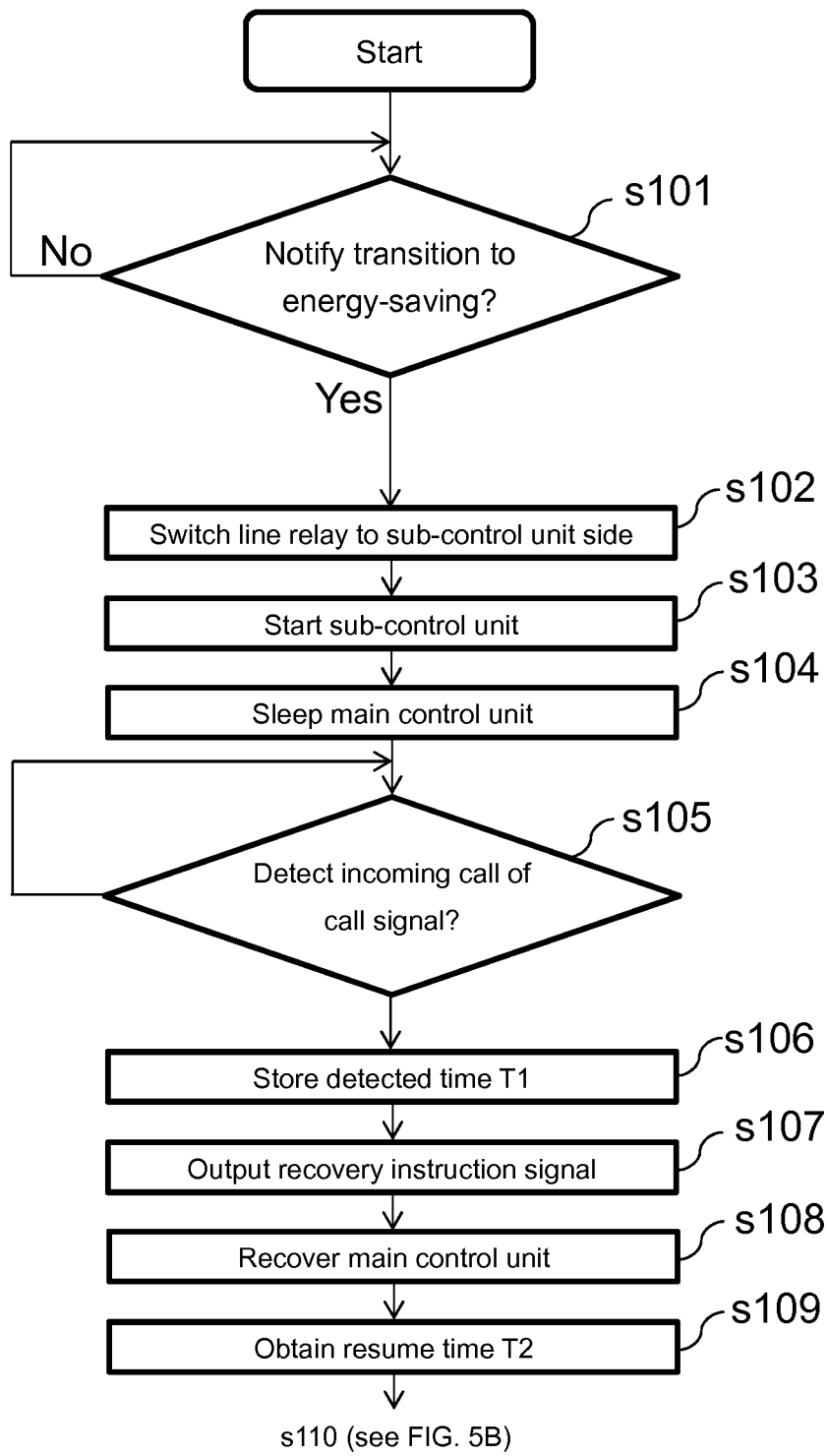

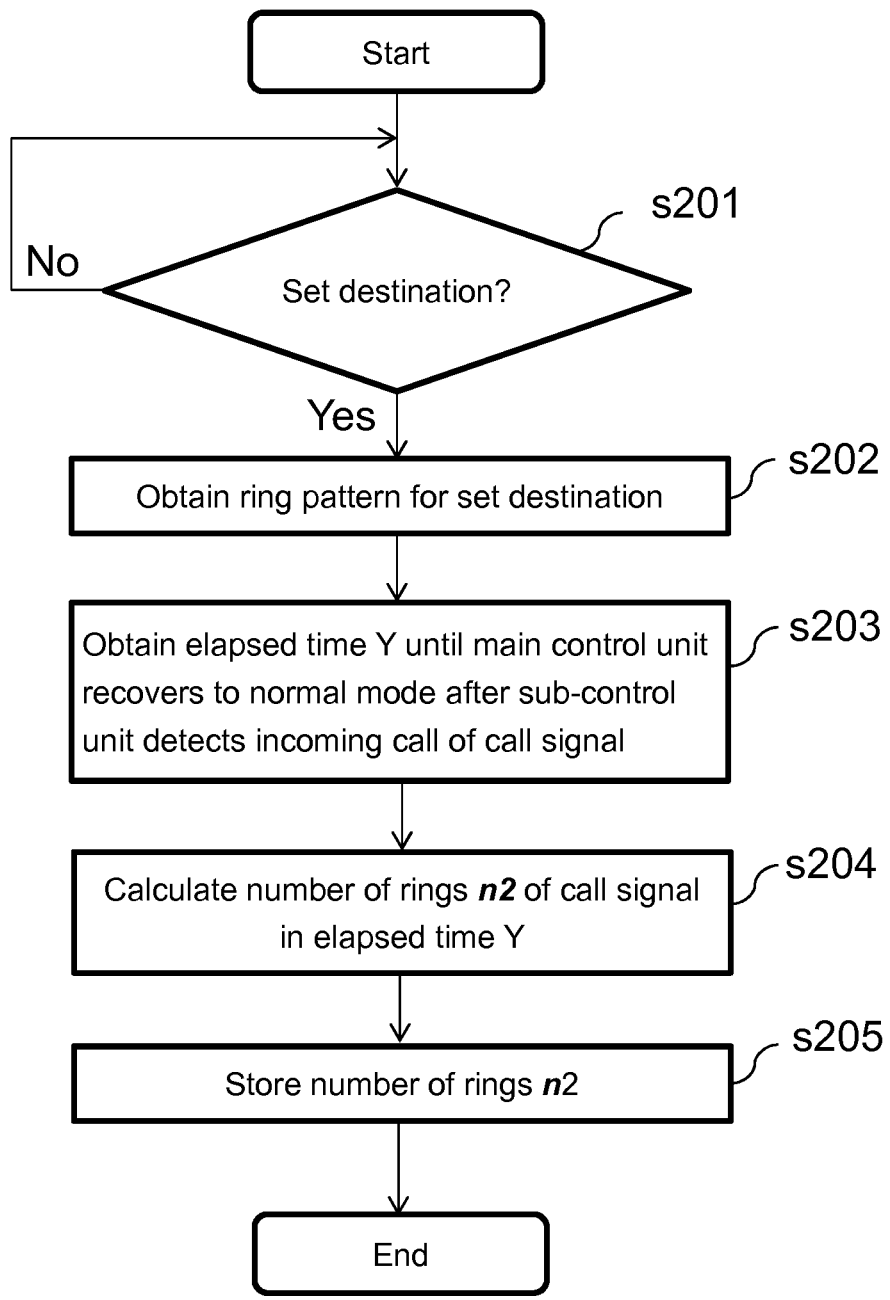

FACSIMILE DEVICE PERFORMING OFF-HOOK IN PRESET SPECIFIED NUMBER OF RINGS WITHOUT RING APPARATUS

INCORPORATION BY REFERENCE

This application relates to and claims priority from Japanese Patent Application Nos. 2013-176809, 2013-176810, and 2013-176811, each filed in the Japan Patent Office on Aug. 28, 2013, the entire disclosure of which are incorporated herein by reference.

BACKGROUND

Unless otherwise indicated herein, the description in this section is not prior art to the claims in this application and is not admitted to be prior art by inclusion in this section.

When there is an incoming call, a public-line network sends a call signal notifying the incoming call to a facsimile device via a telephone line. A telephone set is connected to the telephone line. According to a ring pattern of the call signal, the telephone set rings to notify the incoming call. When a facsimile device with automatic reception function detects the incoming call, a control unit that controls the incoming call counts the number of rings. When the number of rings reaches the specified number of rings, which is preset, the facsimile device automatically put the facsimile device off-hook and starts facsimile reception.

Some facsimile devices have an energy-saving mode. The energy-saving mode operates with reduced power consumption when a facsimile function is not used. Usually, in the energy-saving mode, it is operated that the control unit or a similar unit, which controls the incoming call, enters a sleep state and only functions to detect the incoming call from the public-line network and recover the control unit or a similar unit from the sleep state. Accordingly, there has been proposed a technique that controls the telephone set so as not to ring when the public-line network sends the call signal in the energy-saving mode.

When the incoming call is detected in the energy-saving mode, the control unit, which controls the incoming call, recovers from the sleep state and starts counting the number of rings. Accordingly, the number of rings from the incoming call being detected until the control unit recovers is not counted. This causes the number of rings more than the preset specified number of rings. Accordingly, techniques to prevent this have been variously proposed.

For example, there is proposed a technique that employs a ring control unit causing a telephone set to ring with a dummy bell signal generated corresponding to a call signal. In a normal mode, a main control unit controls the ring control unit to ring the telephone set by the specified number of times. In the energy-saving mode and during recovery from the energy-saving, a sub-control unit controls the ring control unit instead of the main control unit to ring the telephone set by the specified number of times.

SUMMARY

A facsimile device according to a first aspect of the disclosure includes a main control unit and a sub-control unit. The main control unit includes a first main control unit having a normal mode and an energy-saving mode. The first main control unit is configured to count a number of rings in a call signal sent from a public-line network and to put the facsimile device off-hook when the count value reaches a preset specified number of rings in the normal mode, and to suspend the count and off-hook functions in the energy-saving mode. The sub-control unit is configured to detect an incoming call signal when the main control unit is in the energy-saving mode, and cause the main control unit to recover to the normal mode. The main control unit is configured to: calculate, after recovering to the normal mode, the number of rings in an incoming call signal in an elapsed time required from when the sub-control unit detects the incoming call signal until the main control unit recovers to the normal mode; and use the calculated number of rings to count the number of rings in an incoming call signal.

A facsimile device according to a second aspect of the disclosure includes a main control unit, a sub-control unit, and a storage unit. The main control unit includes a second main control unit having a normal mode and an energy-saving mode. The first main control unit is configured to count a number of rings in a call signal sent from a public-line network and to put the facsimile device off-hook when the count value reaches a preset specified number of rings in the normal mode, and to suspend the count and off-hook functions in the energy-saving mode. The sub-control unit is configured to detect an incoming call signal when the main control unit is in the energy-saving mode, and cause the main control unit to recover to the normal mode. The storage unit is configured to store a number of rings of call signal in a predetermined elapsed time required until recovery to the normal mode. The main control unit is configured to count the number of rings of call signal based on the number of rings stored in the storage unit after recovery to the normal mode.

A facsimile device according to a third aspect of the disclosure includes a main control unit, a sub-control unit, and a storage unit. The main control unit includes a third main control unit having a normal mode and an energy-saving mode. The third main control unit is configured to measure a predetermined time and to put the facsimile device off-hook when the measured time reaches a required time in the normal mode, and to suspend the count and off-hook functions in the energy-saving mode. The sub-control unit is configured to detect an incoming call signal when the main control unit is in the energy-saving mode, and cause the main control unit to recover to the normal mode. The storage unit is configured to store the required time required until a number of rings of call signal reaches a preset specified number of rings after the call signal arrives. The main control unit is configured to measure, after recovery to the normal mode, the required time based on elapsed time required until the main control unit recovers to the normal mode after the sub-control unit detects a call signal.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 5A and 5B illustrate a flow of processes of when the fax board according to a first embodiment transitions from the normal mode to an energy-saving mode and then the incoming call is detected in the energy-saving mode;

FIG. 6 illustrates a flow of processes that calculate a number of rings n1 at a fax board according to a second embodiment;

DETAILED DESCRIPTION

Figure 1:
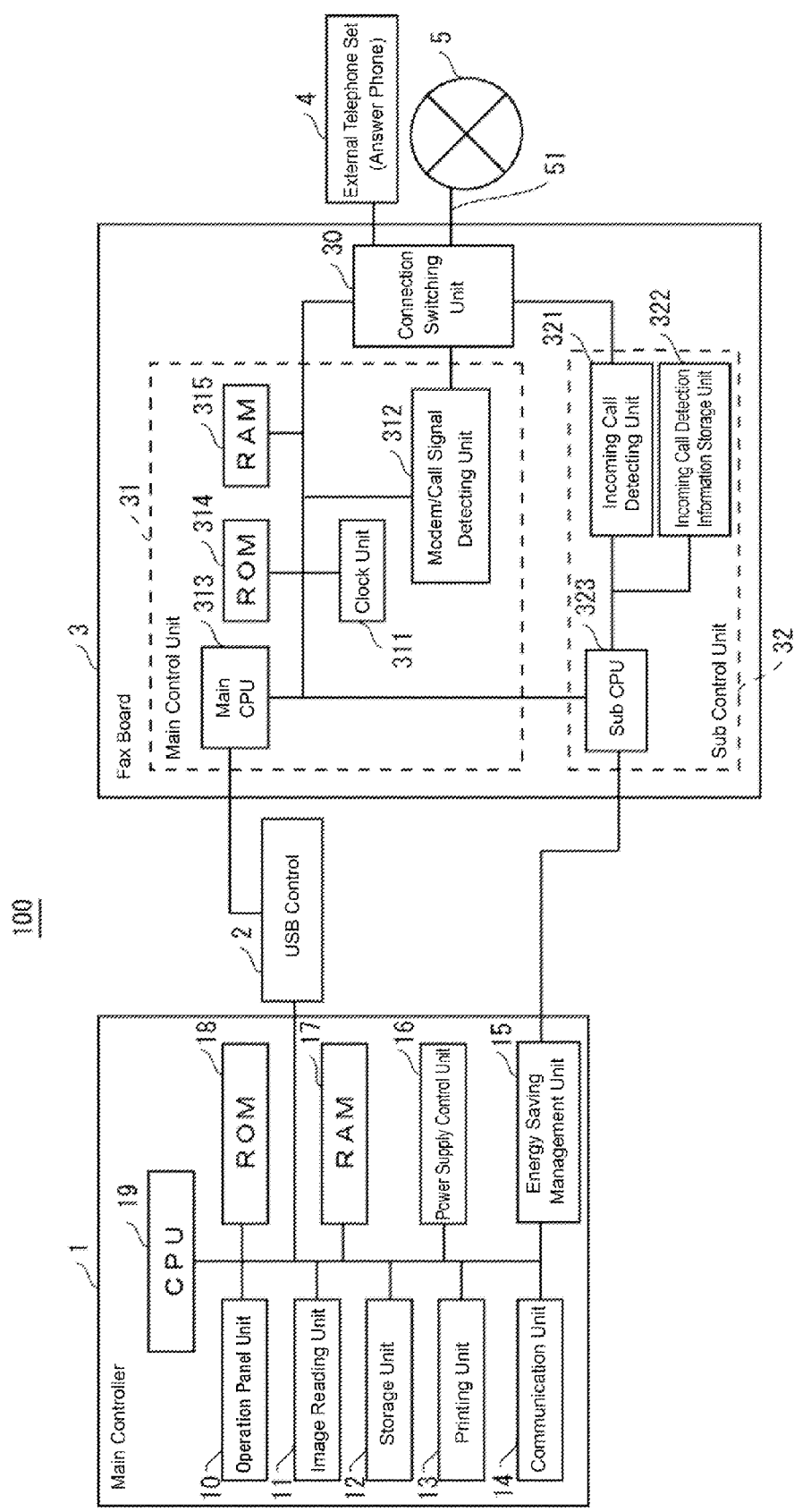
FIG. 1 illustrates a configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The embodiments of the disclosure will now be described in detail with reference to the accompanying drawings. Like reference numerals designate corresponding or identical function throughout the following embodiments.

First Embodiment

As illustrated in FIG. 1, an image forming apparatus 100 is a Multifunction Peripheral (MFP) that has a scanner function, a copy function, a printing function, a facsimile function, and a similar function. The image forming apparatus 100 may be a facsimile device that simply has the facsimile function.

The image forming apparatus 100 includes a main controller 1. The main controller 1 includes an operation panel unit 10, an image reading unit 11, a storage unit 12, a printing unit 13, a communication unit 14, an energy-saving management unit 15, a power supply control unit 16, a RAM 17, a ROM 18, and a CPU 19.

The operation panel unit 10 is a user interface that includes various operation keys such as a touch panel, a numeric keypad, and a start key for inputting an output instruction to start a printing operation.

The image reading unit 11 is a scanner that irradiates light on a document and receives the reflected light or similar light to read a document image.

The storage unit 12 is a storage unit in which image data read by the image reading unit 11 and image data received from an external terminal via the communication unit 14 are accumulated.

The printing unit 13 is a printing unit that prints the image data stored in the storage unit 12.

The communication unit 14 has a function of transmitting and receiving various data to/from the external terminal (not illustrated) via a network such as a Local Area Network (LAN).

The energy-saving management unit 15 manages energy-saving states of respective units of the image forming apparatus 100. The energy-saving management unit 15 sets operating modes of the respective units to a normal mode or an energy-saving mode. In the normal mode, the image forming apparatus 100 operates in a state where the image forming apparatus 100 can perform processes immediately. In the energy-saving mode, the image forming apparatus 100 operates in a state where power consumption is reduced compared with the power consumption in the normal mode. For example, at a fax board 3, when the operation panel unit 10 has not been operated for a predetermined time in the normal mode, the energy-saving management unit 15 transitions the operating mode of the fax board 3 from the normal mode to the energy-saving mode. Then, the energy-saving management unit 15 notifies the fax board 3 of the transition to the energy-saving mode so as to cause the fax board 3 to transition to the energy-saving mode. When a sub-CPU 323, which will be described later, notifies a recovery instruction signal while the fax board 3 is in the energy-saving mode, the energy-saving management unit 15 transitions the operating mode of the fax board 3 from the energy-saving mode to the normal mode.

The energy-saving management unit 15 may manage the energy-saving state so that the operating mode of the entire image forming apparatus 100 is in the energy-saving mode or the normal mode, not the operating modes of the respective units of the image forming apparatus 100.

The power supply control unit 16 controls power supplies of the CPU 19 and respective units connected to the CPU 19 according to the operating modes of the respective units of the image forming apparatus 100. For example, in the normal mode, the power supply control unit 16 supplies electric power from a commercial power supply (not illustrated) to the fax board 3. Thus, the fax board 3 is promptly controlled to ensure facsimile reception. On the other hand, in the energy-saving mode, the power supply control unit 16 reduces electric power supplied to the fax board 3, thus the fax board 3 enters in a sleep state.

The CPU 19 is connected to each of the operation panel unit 10, the image reading unit 11, the storage unit 12, the printing unit 13, the communication unit 14, the energy-saving management unit 15, the power supply control unit 16, RAM 17, ROM 18, and the fax board 3. The CPU 19 performs operation control on the entire image forming apparatus 100 according to predetermined instruction information input from the operation panel unit 10. The Read Only Memory (ROM) 18 stores a control program for operating and controlling the image forming apparatus 100. The CPU 19 reads the control program stored in the ROM 18 and loads the control program to the Random Access Memory (RAM) 17. Thus, the CPU 19 controls the entire apparatus.

The fax board 3 is connected to the main controller 1 via a USB control 2 so as to transmit and receive data with each other. The fax board 3 includes a connection switching unit 30, a main control unit 31, and a sub-control unit 32. The fax board 3 functions as a facsimile transmission/reception unit.

The connection switching unit 30 is connected to a modem/call signal detecting unit 312 of the main control unit 31, an incoming call detecting unit 321 of the sub-control unit 32, an external telephone set 4, and a public-line network 5. The connection switching unit 30 is controlled by a main CPU 313 of the main control unit 31. In the normal mode, the connection switching unit 30 selectively switches the connection of a telephone line 51 of the public-line network 5 between the external telephone set 4 and the modem/call signal detecting unit 312. In the energy-saving mode, the connection switching unit 30 selectively switches the connection of the telephone line 51 of the public-line network 5 between the external telephone set 4 and the incoming call detecting unit 321.

The main control unit 31 operates while the fax board 3 is in the normal mode, and enters the sleep state in the energy-saving mode. The main control unit 31 includes a clock unit 311, the modem/call signal detecting unit 312, the main CPU 313, a ROM 314, and a RAM 315.

The clock unit 311 has a function to output the current date and time information.

The modem/call signal detecting unit 312 includes a modem. The modem/call signal detecting unit 312 is connected to the connection switching unit 30. The modem/call signal detecting unit 312 has a facsimile transmission function and a facsimile reception function. The facsimile transmission function detects the call signal sent from the public-line network 5 and generates a facsimile signal from image data read by the image reading unit 11 and from image data stored in the storage unit 12, so as to transmit the facsimile signal via the public-line network 5. The facsimile reception function receives the facsimile signal via the public-line network 5.

The main CPU 313 is connected to each of the clock unit 311, the modem/call signal detecting unit 312, the ROM 314, the RAM 315, the sub-CPU 323, and the connection switching unit 30. The main CPU 313 operates and controls the overall fax board 3. The ROM 314 stores a control program for operating and controlling the fax board 3. The main CPU 313 reads out the control program stored in the ROM 314 and loads the control program on the RAM 315 so as to perform a control on the overall fax board 3.

TABLE 1

| Country (destination) | Ring pattern |
| --- | --- |
| Japan | ON: 1.0 second OFF: 2.0 seconds |
| United States of America | ON: 2.0 seconds OFF: 4.0 seconds |
| Denmark | ON: 0.7 seconds OFF: 6.7 seconds |
| Sweden | ON: 1.0 second OFF: 5.0 seconds |
| Finland | ON: 0.8 seconds OFF: 2.6 seconds |
|  | ON: 1.2 seconds OFF: 2.6 seconds |
| Spain | ON: 1.5 seconds OFF: 3.0 seconds |
| Netherlands | ON: 1.0 second OFF: 4.0 seconds |
| United Kingdom | ON: 0.4 seconds OFF: 0.2 seconds |
|  | ON: 0.4 seconds OFF: 2.0 seconds |

Figure 2:
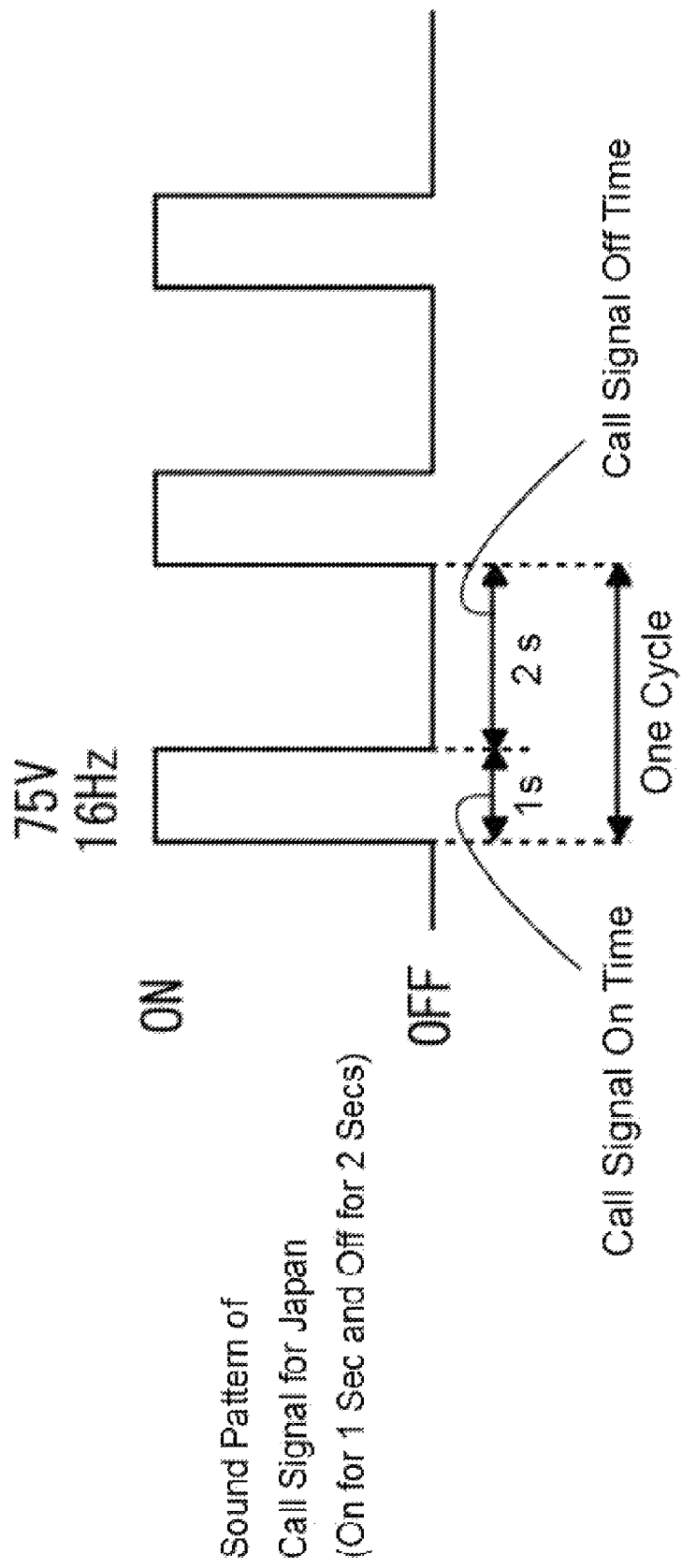
FIG. 2 illustrates an exemplary ring pattern of a call signal stored in a ROM of a main control unit according to the one embodiment.

The ROM 314 also stores a preset specified number of rings N and the ring patterns of the call signals depending on destinations illustrated in Table 1. The specified number of rings N is the number of rings of the call signal until the facsimile starts automatic reception. The specified number of rings N may be a fixed value preset by a user, or may be a fixed value preliminary configured with a program. As illustrated in Table 1, the ring patterns are preliminary determined depending on countries (depending on destinations). For example, in Japan, as illustrated in FIG. 2, the call signal is 75 V and 16 Hz, and the ring pattern of on (ring) for one second and off (halt) for two seconds is periodically repeated. In this embodiment, the following describes assuming that the destination of the image forming apparatus 100 is Japan, and the ring pattern of the call signal for Japan is set in the ROM 314.

Upon notification of transition to the energy-saving mode by the energy-saving management unit 15, the main CPU 313 controls the connection switching unit 30. Then, the connection switching unit 30 switches the connection constitution in the normal mode, which selectively switches the connection of the telephone line 51 of the public-line network 5 between the external telephone set 4 and the modem/call signal detecting unit 312, to the connection constitution in the energy-saving mode, which selectively switches the connection of the telephone line 51 of the public-line network 5 between the external telephone set 4 and the incoming call detecting unit 321. At the same time, the main CPU 313 starts the sub-control unit 32. The main CPU 313 requests the sub-CPU 323 to cause the fax board 3 to recover to the normal mode upon detection of the incoming call of the call signal from the public-line network 5. Afterwards, the main control unit 31 is powered off while the power supply control unit 16 reduces power consumption supplied to the fax board 3 and electric power is supplied to the sub-control unit 32. Thus, the fax board 3 enters the sleep state.

When the sub-CPU 323 detects the incoming call of the call signal from the public-line network 5, the energy-saving management unit 15 transitions the fax board 3 from the energy-saving mode to the normal mode. The power supply control unit 16 powers on the main control unit 31. Thus, the main control unit 31 recovers from the sleep state and starts in the normal mode.

The recovered main CPU 313 controls the connection switching unit 30. Then, the connection switching unit 30 switches the connection constitution in the energy-saving mode, which selectively switches the connection of the telephone line 51 of the public-line network 5 between the external telephone set 4 and the incoming call detecting unit 321, to the connection constitution in the normal mode, which selectively switches the connection of the telephone line 51 of the public-line network 5 between the external telephone set 4 and the modem/call signal detecting unit 312.

When recovering to the normal mode, the main CPU 313 obtains a resume time T2 at the time of recovery from the clock unit 311, also obtains a detected time T1 when the call signal is detected from the sub-CPU 323, and obtains the specified number of rings N stored in the ROM 314. Subsequently, the main CPU 313 calculates the number of rings n1 of the call signal based on the resume time T2, the detected time T1, and the specified number of rings N. The number of rings n1 is the number of rings during a time required for the main CPU 313 to recover after the sub-CPU 323 detects the call signal (elapsed time Y). A specific method for calculating the number of rings will be described later. The main CPU 313 initializes a counter that counts the number of rings of the call signal detected via the modem/call signal detecting unit 312 at the calculated number of rings n1. The main CPU 313 counts the number of rings of call signal detected via the modem/call signal detecting unit 312. That is, the main CPU 313 starts counting from the calculated number of rings n1.

When the count value reaches the specified number of rings N stored in the ROM 314, the main CPU 313 controls the connection switching unit 30 to switch a connection destination of the telephone line 51 from the external telephone set 4 to the modem/call signal detecting unit 312. Then, the main CPU 313 performs off-hook and starts facsimile reception. The time required for the fax board 3 to recover from the energy-saving mode to the normal mode is assumed shorter than the time corresponding to the preset specified number of rings N.

The sub-control unit 32 is provided to detect the incoming call of call signal from the public-line network 5 instead of the main control unit 31 and recover the fax board 3 to the normal mode in the energy-saving mode. In the normal mode of the fax board 3, the sub-control unit 32 is stopped by power-off by the power supply control unit 16. In the energy-saving mode, the sub-control unit 32 is started by power-on by the power supply control unit 16. The sub-control unit 32 includes the sub-CPU 323, the incoming call detecting unit 321, and an incoming call detection information storage unit 322.

The incoming call detecting unit 321 detects the incoming call of call signal sent from the public-line network 5 via the connection switching unit 30.

The incoming call detection information storage unit 322 includes a semiconductor memory, a latch circuit, or a similar component. The incoming call detection information storage unit 322 is a storage unit that stores the detected time T1 when the incoming call detecting unit 321 detects the incoming call of call signal.

The sub-CPU 323 includes a one-chip microcomputer or a similar component. The sub-CPU 323 is connected to the incoming call detecting unit 321, the incoming call detection information storage unit 322, the main CPU 313, and the energy-saving management unit 15. The sub-CPU 323 loads the control program stored in a ROM (not illustrated) to a RAM (not illustrated). Thus, the sub-CPU 323 controls the entire sub-control unit 32. When the sub-CPU 323 detects the incoming call of call signal via the incoming call detecting unit 321, the sub-CPU 323 outputs the recovery instruction signal to the energy-saving management unit 15 of the main controller 1 to cause the fax board 3 to recover to the normal mode. The sub-CPU 323 obtains the detected time T1 when detecting the incoming call of call signal via a clock unit (not illustrated), and causes the incoming call detection information storage unit 322 to store the detected time T1.

Figure 3:
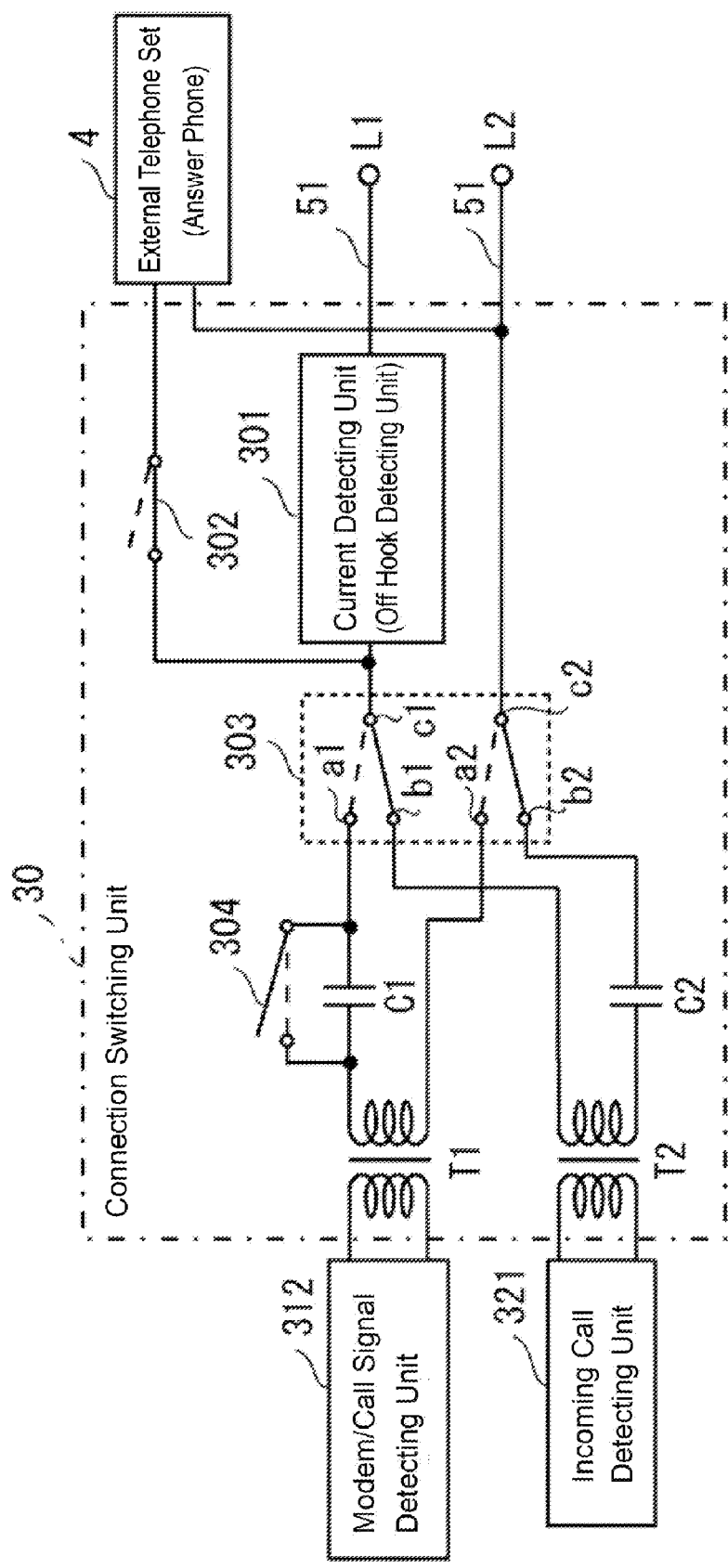
FIG. 3 illustrates a connection state of a connection switching unit according to the one embodiment.

Subsequently, the following describes a connection state of the connection switching unit 30 with reference to FIG. 3.

Terminals L1 and L2 are connected to the respective two-wire telephone lines 51 from the public-line network 5. The terminal L1 is connected to a contact point c1 of a line relay 303 via a current detecting unit (off-hook detecting unit) 301 that detects the off-hook. The terminal L2 is connected to a contact point c2 of the line relay 303.

The external telephone set 4 has one line connected to a part between the current detecting unit 301 and the contact point c1 of the line relay 303 via a first relay 302 and the other line connected to a part between the terminal L2 and the contact point c2 of the line relay 303. The first relay 302 is closed in an incoming call standby state that stands by for the incoming call.

The line relay 303 includes a contact point a1 connected to one end of a primary side terminal of a transformer T1 via a capacitor C1 connected in series and a contact point a2 connected to the other end of the primary side terminal of the transformer T1. The modem/call signal detecting unit 312 is connected to a secondary side terminal of the transformer T1.

Between the contact point a1 of the line relay 303 and the one end of the primary side terminal of the transformer T1, a second relay 304 is located so as to bypass the capacitor C1. The second relay 304 is open in the incoming call standby state.

The line relay 303 includes a contact point b1 connected to one end of a primary side terminal of a transformer T2 and a contact point b2 connected to the other end of the primary side terminal of the transformer T2 via a capacitor C2 connected in series. The incoming call detecting unit 321 is connected to the secondary side terminal of the transformer T2.

In the energy-saving mode, when the call signal notifying the incoming call is input from the public-line network 5 to the terminals L1 and L2, the call signal is input to the line relay 303 via the current detecting unit 301. In the incoming call standby state, since the first relay 302 is closed, the call signal is also input to the external telephone set 4. The call signal rings the external telephone set 4.

In the line relay 303, in the energy-saving mode, the contact point c1 and the contact point c2 are connected to the contact point b1 and the contact point b2, respectively. The call signals input from the contact point c1 and the contact point c2 are output to the incoming call detecting unit 321 side. The capacitor C2 cuts off a DC component and passes an AC component. The call signal, which is an AC pulse signal, is input to the incoming call detecting unit 321 via the capacitor C2 and the transformer T2.

When the incoming call detecting unit 321 detects the incoming call of call signal, the main control unit 31 recovers from the sleep state. Then, in the line relay 303, the connection destinations of the contact point c1 and the contact point c2 switch from the contact point b1 and the contact point b2 to the contact point a1 and the contact point a2, respectively. Thus, the call signal from the public-line network 5 is output to the modem/call signal detecting unit 312 side, passes the capacitor C1, and is input to the modem/call signal detecting unit 312 via the transformer T1.

When the modem/call signal detecting unit 312 detects the call signal, the main CPU 313 counts the number of rings of the call signal detected by the modem/call signal detecting unit 312. When the incoming call detecting unit 321 detects the call signal in the energy-saving mode, the main CPU 313 starts counting from the calculated number of rings n1.

When the number of rings reaches the preset specified number of rings N, the first relay 302 is open while the second relay 304 is closed. Accordingly, between the terminals L1 and L2 is closed, thus forming a DC loop (off-hook). Opening of the first relay 302 disconnects the external telephone set 4 from the telephone line 51, thus the ring is stopped.

When the DC loop is formed, a DC loop current is detected at the public-line network 5, sending of the call signal is stopped, and the facsimile signal is sent from the public-line network 5. The facsimile signals input via the terminals L1 and L2 are output to the modem/call signal detecting unit 312 via the line relay 303. Then, modem/call signal detecting unit 312 starts a facsimile reception operation.

If the facsimile signal is not sent from the public-line network 5, the second relay 304 is open while the first relay 302 is closed. The modem/call signal detecting unit 312 and the telephone line 51 are disconnected, the telephone line 51 and the external telephone set 4 are connected, and an answering phone function of the external telephone set 4 is operated.

Figure 4:
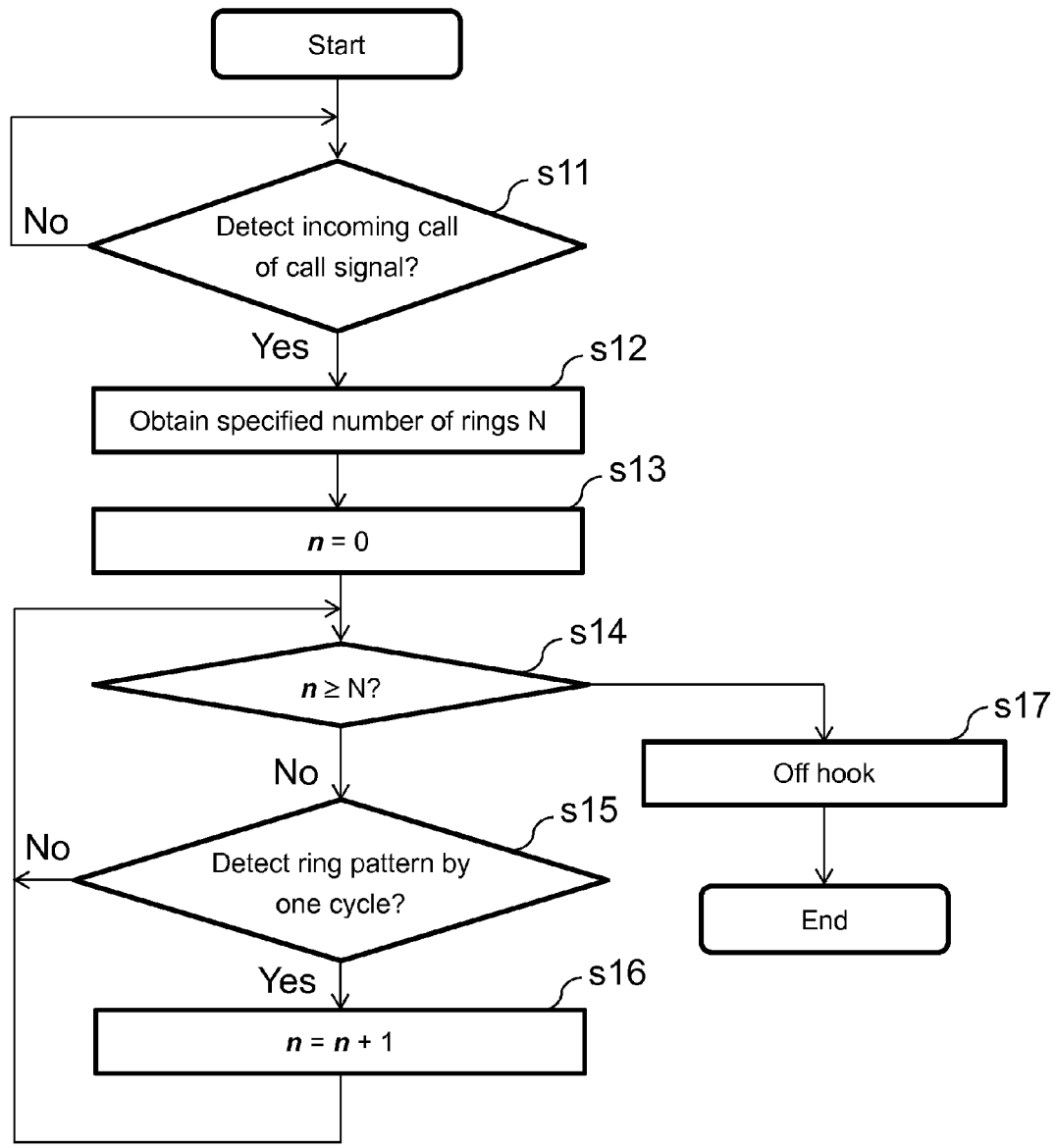
FIG. 4 illustrates a flow of processes of when a fax board according to the one embodiment detects an incoming call in a normal mode.

The following describes a flow of processes of the fax board 3 of the image forming apparatus 100 with the above-described constitution. First, with reference to FIG. 4, the following describes a flow of processes of when the incoming call is detected while the fax board 3 is in the normal mode. Here, since the mode is the normal mode, the following describes assuming that the main control unit 31 is started, the sub-control unit 32 is stopped, and the line relay 303 is switched to the main control unit 31 side.

The main CPU 313 stands by until the modem/call signal detecting unit 312 detects the incoming call of call signal (No at Step s11), upon detection of the incoming call of call signal (Yes at Step s11), the main CPU 313 obtains the specified number of rings N stored in the ROM 314 (Step s12). Subsequently, the main CPU 313 sets "0" as a variable n that counts the number of rings (Step s13), and determines whether n≥N is met or not (Step s14).

If n N is not met (No at Step s14), the main CPU 313 determines whether the ring pattern of call signal is detected by one cycle via the modem/call signal detecting unit 312 or not (Step s15).

If the ring pattern is not detected by one cycle (No at Step s15), the main CPU 313 returns to the process that determines whether n≥N is met or not (Step s14). If the ring pattern is not detected by one cycle, the main CPU 313 may stand by until the ring pattern is detected by one cycle and then may determine whether the ring pattern is detected by one cycle or not (Step s15). When the ring pattern is detected by one cycle (Yes at Step s15), the main CPU 313 increments n (Step s16), and returns to the process that determines whether n≥N is met or not (Step s14).

When n≥N is met (Yes at Step s14), this suggests that the number of rings of the call signal reaches the specified number of rings N, the main CPU 313 performs off-hook (Step s17) and terminates this process. After that, the modem/call signal detecting unit 312 starts the facsimile reception process.

Figure 5B:
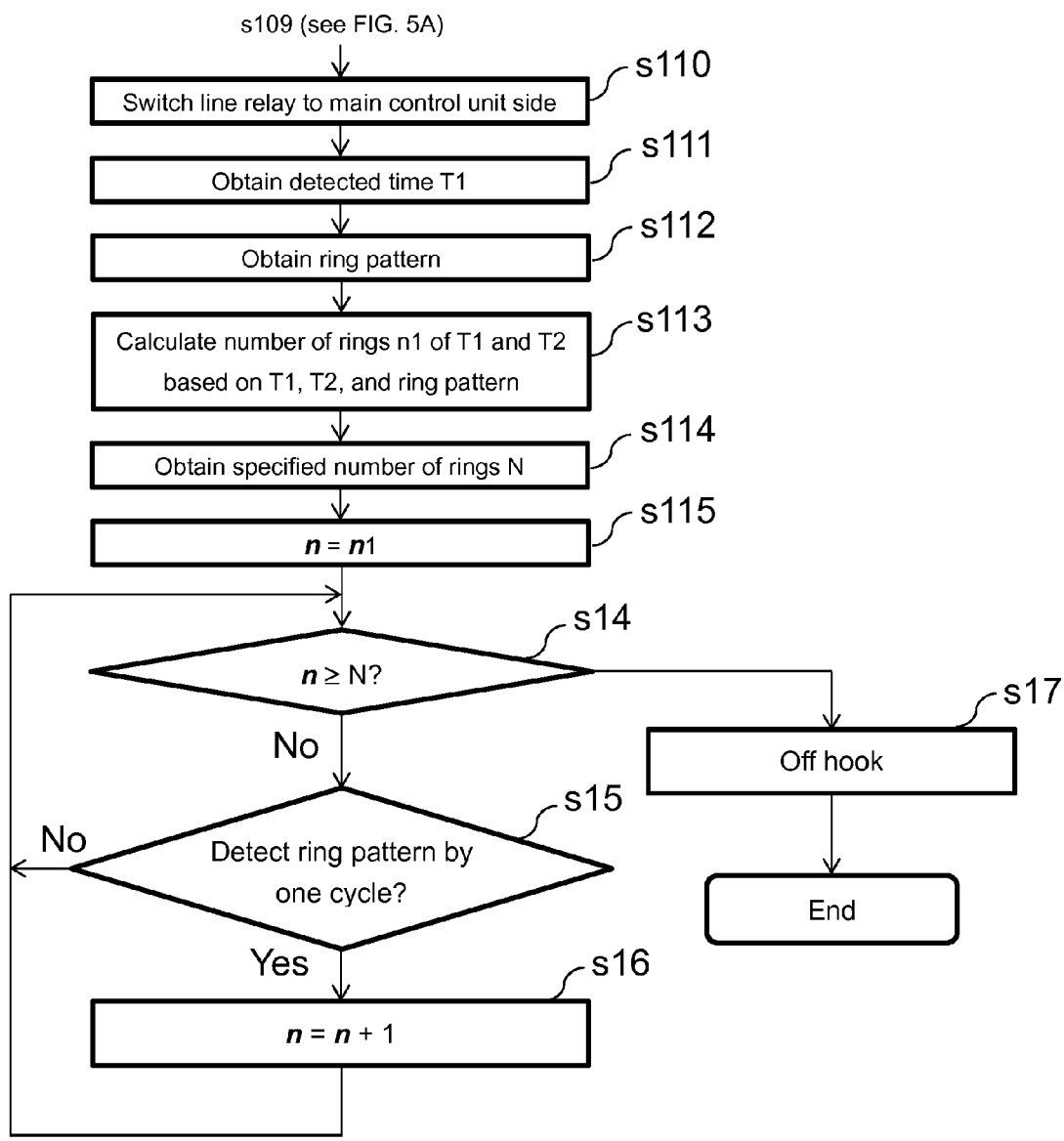

Subsequently, with reference to FIGS. 5A and 5B, the following describes a flow of processes of when the fax board 3 transitions from the normal mode to the energy-saving mode, and the incoming call is detected in the energy-saving mode. Here, first, the fax board 3 is in the normal mode where the main control unit 31 starts, the sub-control unit 32 stops, and the line relay 303 is switched to the main control unit 31 side. The following processes of Step s14 to Step s17 correspond to Step s14 to Step s17 of FIG. 4, respectively.

The main CPU 313 stands by for notification of the transition to the energy-saving mode by the energy-saving management unit 15 (No at Step s101). Upon the notification of the transition to the energy-saving mode (Yes at Step s101), the main CPU 313 switches the connection destination of the line relay 303 from the main control unit 31 side (the modem/call signal detecting unit 312) to the sub-control unit 32 side (the incoming call detecting unit 321) (Step s102). The sub-control unit 32 starts (Step s103), and the main control unit 31 enters the sleep state (Step s104). The started sub-CPU 323 stands by until detection of the incoming call of call signal by the incoming call detecting unit 321 (No at Step s105).

When the incoming call detecting unit 321 detects the incoming call of call signal (Yes at Step s105), the sub-CPU 323 causes the incoming call detection information storage unit 322 to store the detected time T1 of when the incoming call detecting unit 321 detects the incoming call of call signal (Step s106), and outputs the recovery instruction signal to the energy-saving management unit 15 (Step s107). This recovers the main control unit 31 via the energy-saving management unit 15 and starts the main control unit 31 in the normal mode (Step s108).

The started main CPU 313 obtains the current time via the clock unit 311 and sets the time as the resume time T2 (Step s109). Subsequently, the main CPU 313 switches the connection destination of the line relay 303 from the sub-control unit 32 side (the incoming call detecting unit 321) to the main control unit 31 side (the modem/call signal detecting unit 312) (Step s110). The main CPU 313 also obtains the detected time T1 from the sub-CPU 323 (Step s111), and obtains the ring pattern of call signal for the destination stored in the ROM 314 (Step s112).

Subsequently, the main CPU 313 calculates the number of rings n1 of the call signal until the main CPU 313 recovers from the sleep state to the normal mode after the sub-CPU 323 detects the incoming call of call signal based on the detected time T1, the resume time T2, and the ring pattern (Step s113). Specifically, the main CPU 313 counts: number of rings n1<elapsed time Y/(call signal on time+call signal off time)+1 and obtains the maximum integer value of the number of rings n1 meeting this expression.

Here, elapsed time Y=resume time T2−detected time T1. The call signal on time is an on (ring) time by the one cycle of the ring pattern of call signal. The call signal off time is off (halt) time by the one cycle of the ring pattern of call signal. That is, (call signal on time+call signal off time) is a ring cycle of the call signal.

For example, assume that the elapsed time Y is "6.5 seconds" and (call signal on time+call signal off time) is (1+2) seconds. Since the number of rings n1<6.5/(1+2)+1 is met, the number of rings n1<3.5 is met, and therefore the number of rings n1=3 is established. That is, it is found that the number of rings of the call signal until the main CPU 313 recovers from the sleep state after the sub-CPU 323 detects the incoming call of call signal, which is 6.5 seconds, is three times.

Subsequently, the main CPU 313 obtains the specified number of rings N stored in the ROM 314 (Step s114), sets n1 to n, which is the variable that counts the number of rings (Step s115), and determines whether n≥N is met or not (Step s14). That is, here, whether n1≥N is met or not is determined.

If n≥N is not met (No at Step s14), the main CPU 313 repeats the processes of Steps s14 to s16, detects the ring pattern of call signal by one cycle via the modem/call signal detecting unit 312 (Yes at Step s15), increments n (Step s16), and determines whether n≥N is met or not (Step s14). If the ring pattern is not detected by one cycle (No at Step s15), the main CPU 313 repeats processes of Step s14 and Step s15. The main CPU 313 may stand by until the ring pattern is detected by one cycle and then may perform determination of Step s14.

When n≥N is met (Yes at Step s14), which suggests that the number of rings of the call signal reaches the specified number of rings N, the main CPU 313 performs the off-hook (Step s17) and terminates this process. After that, the modem/call signal detecting unit 312 starts the facsimile reception process. After that, the main CPU 313 may stop the sub-control unit 32.

The time taken from the process of Step s110 where the line relay 303 is switched to the main control unit 31 side to the process of Step s15 where the modem/call signal detecting unit 312 detects the call signal, which are described above, is time that is almost negligible. It is assumed that this time is not affected by the number of rings of the call signal that the main CPU 313 counts.

The main CPU 313 sets the counted number of rings n1 as an initial value of the counter that counts the number of rings of call signal detected via the modem/call signal detecting unit 312 and determines whether the count value reaches the specified number of rings N or not; however, this should not be construed in a limiting sense. For example, the main CPU 313 may determine whether a value found by adding the counted number of rings n1 to the count value of the number of rings of call signal detected via the modem/call signal detecting unit 312 reaches the specified number of rings N or not. That is, it is only necessary that the main CPU 313 counts the number of rings of the call signal detected by the modem/call signal detecting unit 312 based on the counted number of rings n1 and perform the off-hook when the count value reaches the specified number of rings N.

By the above-described processes, this first embodiment counts the number of rings of call signal in the elapsed time Y, which is required for the main control unit 31 to recover after the sub-control unit 32 detects the incoming call of call signal. Then, the main control unit 31 counts the number of rings of call signal based on the counted number of rings n1. This eliminates the need for locating a ring apparatus and can perform the off-hook with the correct number of rings, which is the specified number of rings preset by the user or a similar person.

When recovering to the normal mode, the main control unit 31 calculates the number of rings of call signal in the elapsed time Y found by subtracting the detected time T1 when the sub-control unit 32 detects the incoming call of call signal from the resume time T2 when the main control unit 31 recovers. Since the main control unit 31 starts counting from the calculated number of rings n1, even if the elapsed time Y is changed, the main control unit 31 can perform the off-hook by the preset specified number of rings N. The function of the sub-control unit 32 is simplified. This ensures configuration with low-price components, resulting in cost reduction. The external telephone set 4 is ringed with the call signal. This eliminates the need for locating the ring apparatus separately to ring the external telephone set 4, ensuring cost reduction.
Second Embodiment The following describes the second embodiment.

In the second embodiment, the ROM 314 further stores time required for the main control unit 31 to recover to the normal mode after the sub-control unit 32 detects the incoming call of call signal (the elapsed time Y). In this embodiment, the following describes a case assuming that the destination of the image forming apparatus 100 is Japan. The elapsed time Y is the time that the main control unit 31 actually recovers to the normal mode after the sub-control unit 32 detects the incoming call of call signal. The elapsed time Y is the time obtained in advance by measurement, a design calculation or a similar method. This embodiment is assumed that almost the same time is taken whenever the main control unit 31 recovers to the normal mode after the sub-control unit 32 detects the incoming call of call signal.

When the destination is set via the operation panel unit 10, the main CPU 313 refers to the ROM 314 and obtains the ring pattern of call signal for the set destination and the elapsed time Y. Then, the main CPU 313 calculates the number of rings n1 of the call signal in the elapsed time Y based on the ring pattern of the call signal for the destination and the elapsed time Y, and causes the ROM 314 to store the number of rings n1. A method for calculating the number of rings n1 will be described later.

When recovering to the normal mode, the main CPU 313 obtains the specified number of rings N stored in the ROM 314 and the number of rings n1 preliminary counted and stored in the ROM 314. Subsequently, the main CPU 313 initializes the counter that counts the number of rings of call signal detected via the modem/call signal detecting unit 312 at the number of rings n1. The main CPU 313 counts the number of rings of call signal detected via the modem/call signal detecting unit 312. That is, the main CPU 313 starts counting from the calculated number of rings n1.

The following describes a flow of processes of the fax board 3 of the image forming apparatus 100 with the above-described constitution. First, with reference to FIG. 4, the following describes a flow of processes of calculation of the number of rings n2 by the main CPU 313. It is assumed that the destination is preset to the image forming apparatus 100 at the time of delivery or similar time.

The main CPU 313 determines whether the destination is set via the operation panel unit 10 or not (Step s201). If the destination is not set, the main CPU 313 stands by until the destination is set (No at Step s2101). If the destination is set (Yes at Step s201), the main CPU 313 refers to the ROM 314 to obtain the ring pattern of call signal for the set destination (Step s202). The main CPU 313 also obtains the preliminary measured elapsed time Y until the main control unit recovers to the normal mode after the sub-control unit 32 detects the incoming call of call signal (Step s203).

Subsequently, based on the elapsed time Y and the ring pattern of call signal for the destination, the main CPU 313 calculates the number of rings n2 of call signal in the elapsed time Y (Step s204). Specifically, the main CPU 313 calculates: number of rings n2<elapsed time Y/(call signal on time+call signal off time)+1 and obtains the maximum integer value of the number of rings n2 meeting this expression.

Here, the call signal on time is an on (ring) time by the one cycle of the ring pattern of call signal. The call signal off time is off (halt) time by the one cycle of the ring pattern of call signal. That is, (call signal on time+call signal off time) is a ring cycle of the call signal. The main CPU 313 determines whether the destination is set via the operation panel unit 10 or not (Step s301). If the destination is not set, the main CPU 313 stands by until the destination is set (No at Step s301).

For example, assume that the elapsed time Y is "6.5 seconds," and (call signal on time+call signal off time) is (1+2) seconds. Since the number of rings n2<6.5/(1+2)+1 is met, the number of rings n2<approximately 3.2 is met, and therefore the number of rings n2=3 is established. That is, it is found that the number of rings of the call signal in the elapsed time Y, which is "6.5 seconds", is three times.

When the main CPU 313 calculates the number of rings n2, the main CPU 313 causes the ROM 314 to store the number of rings n2 (Step s205) and terminates this process.

Figure 7:
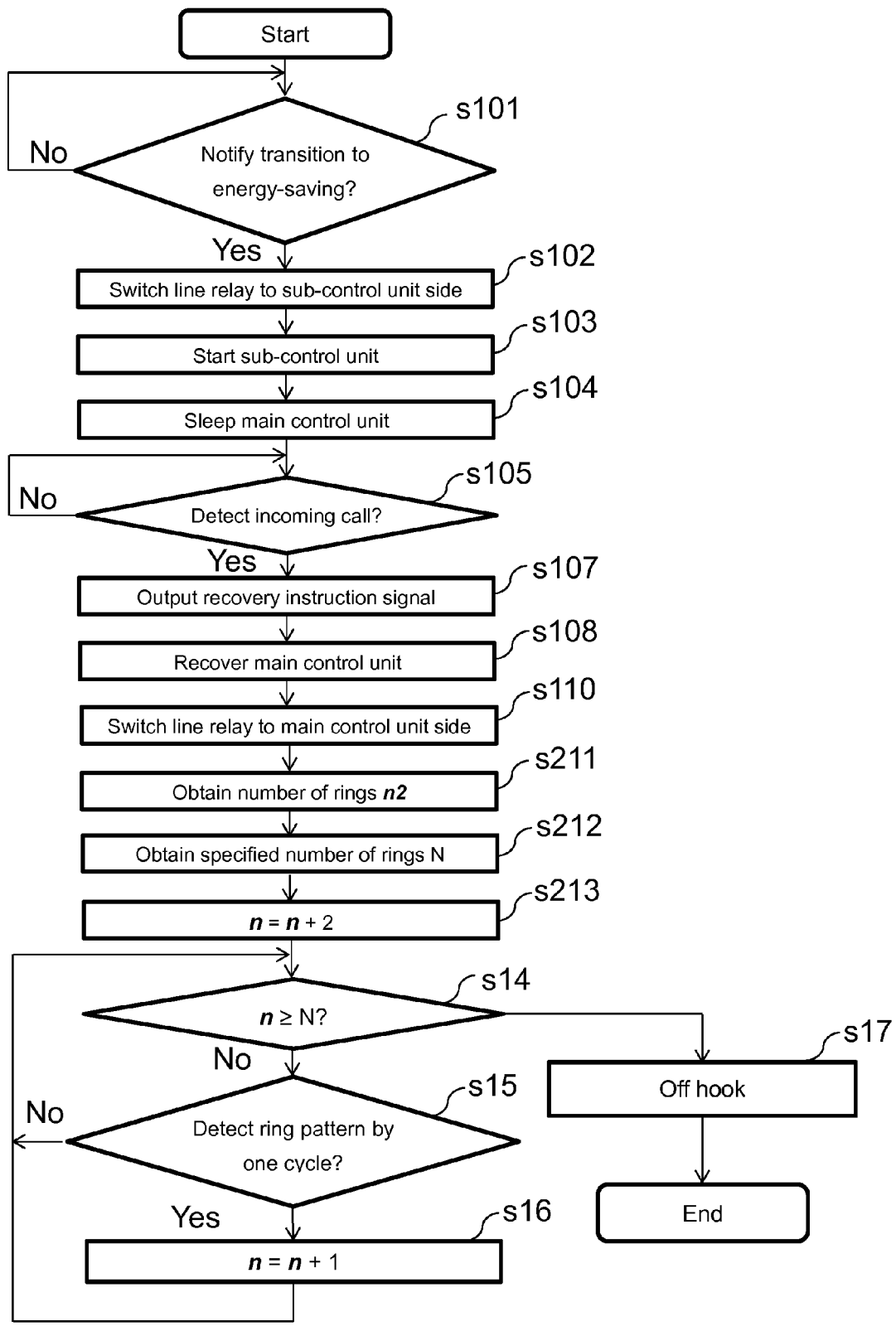
FIG. 7 illustrates a flow of processes of when the fax board according to the second embodiment transitions from the normal mode to the energy-saving mode and then the incoming call is detected in the energy-saving mode.

Subsequently, with reference to FIG. 7, the following describes a flow of processes of when the fax board 3 transitions from the normal mode to the energy-saving mode and the incoming call is detected in the energy-saving mode. Here, first, the fax board 3 is in the normal mode where the main control unit 31 starts, the sub-control unit 32 stops, and the line relay 303 has been switched to the main control unit 31 side. The following processes of Step s101 to Step s110 correspond to Step s101 to Step s110 of FIGS. 5A and 5B, respectively. Furthermore, the following processes of Step s14 to Step s17 correspond to Step s14 to Step s17 of FIGS. 4, 5A, and 5B, respectively.

When the incoming call detecting unit 321 detects the incoming call of call signal (Yes at Step s105), the sub-CPU 323 outputs the recovery instruction signal to the energy-saving management unit 15 (Step s106). This recovers the main control unit 31 via the energy-saving management unit 15 and starts the main control unit 31 in the normal mode (Step s108).

The started main CPU 313 switches the connection destination of the line relay 303 from the sub-control unit 32 side (the incoming call detecting unit 321) to the main control unit 31 side (the modem/call signal detecting unit 312) (Step s110). The main CPU 313 also obtains the number of rings n2 with reference to the ROM 314 (Step s211) and obtains the specified number of rings N (Step s212).

Subsequently, the main CPU 313 sets the number of rings n2 to n, which is the variable that counts the number of rings (Step s213), and determines whether n≥N is met or not (Step s14). That is, here, whether n2≥N is met or not is determined. The following processes are the same as the processes of the first embodiment.

By the above-described processes, this second embodiment preliminary measures the elapsed time Y until the main control unit 31 recovers after the sub-control unit 32 detects the call signal, and then stores the elapsed time Y in the ROM 314. When the destination is set, the number of rings of call signal for the destination in the elapsed time Y is calculated and is stored in the ROM 314. When recovering from the energy-saving mode, the main control unit 31 counts the number of rings of call signal based on the preliminary calculated number of rings n1. This eliminates the need for locating a ring apparatus and can perform the off-hook with the correct number of rings, which is the specified number of rings preset by the user or a similar person.

In this embodiment, the sub-control unit 32 has only very simple functions that detect the incoming call of call signal and causes the main control unit 31 to recover to the normal mode. This ensures configuration of the sub-control unit 32 with low-price components, resulting in cost reduction. The external telephone set 4 is ringed with the call signal. This eliminates the need for locating the ring apparatus separately to ring the external telephone set 4, ensuring cost reduction.

Third Embodiment

The following describes the third embodiment.

In this embodiment, the following describes a case assuming that the destination of the image forming apparatus 100 is Japan.

When the destination and the specified number of rings N, which is the number of rings of call signal until the start of automatic reception by the facsimile, are set via the operation panel unit 10, the main CPU 313 calculates the required time T until the off-hook is performed after the incoming call of call signal is detected in the energy-saving mode, and the ROM 314 stores the required time T. Then, the ROM 314 also stores the destination and the specified number of rings N set via the operation panel unit 10. A method for calculating the required time T will be described later. The required time T is assumed shorter than the time corresponding to the preset specified number of rings N. The following describes the specified number of rings N as a fixed value set by the user via the operation panel unit 10; however, the specified number of rings N may be a fixed value preliminary configured with a program.

When recovering to the normal mode, the main CPU 313 obtains the resume time T2 at the time of recovery from the clock unit 311, also obtains detected time T1 when the call signal is detected from the sub-CPU 323, and obtains the required time T stored in the ROM 314. Subsequently, the main CPU 313 determines whether the time measured by a timer based on the time found by subtracting the detected time T1 from the resume time T2 reaches the required time T or not.

When the count value reaches the required time T, the main CPU 313 controls the connection switching unit 30 to switch a connection destination of the telephone line 51 from the external telephone set 4 to the modem/call signal detecting unit 312. Then, the main CPU 313 performs the off-hook and starts facsimile reception. Upon detection of the incoming call of call signal via the modem/call signal detecting unit 312 in the normal mode, the main CPU 313 counts the number of rings of call signal. When the count value reaches the specified number of rings N, the main CPU 313 performs the off-hook and starts facsimile reception.

When the incoming call detecting unit 321 detects the incoming call of call signal in the energy-saving mode, the main CPU 313 determines whether the required time T is reached or not after the incoming call detecting unit 321 detects the incoming call of call signal. When the required time T is reached, the first relay 302 is open while the second relay 304 is closed. Accordingly, between the terminals L1 and L2 are closed, thus forming the DC loop (off-hook). Opening the first relay 302 disconnects the external telephone set 4 from the telephone line 51, thus the ring is stopped. When the modem/call signal detecting unit 312 detects the incoming call of call signal in the normal mode, the main CPU 313 counts the number of rings of call signal detected by the modem/call signal detecting unit 312. When the count value reaches the specified number of rings N, the off-hook is performed.

When the DC loop is formed, a DC loop current is detected at the public-line network 5, sending of the call signal is stopped, and the facsimile signal is sent from the public-line network 5. The facsimile signals input via the terminals L1 and L2 are output to the modem/call signal detecting unit 312 via the line relay 303. Then, modem/call signal detecting unit 312 starts a facsimile reception operation.

If the facsimile signal is not sent from the public-line network 5, the second relay 304 is open while the first relay 302 is closed. The modem/call signal detecting unit 312 and the telephone line 51 are disconnected, the telephone line 51 and the external telephone set 4 are connected, and an answering phone function of the external telephone set 4 is operated.

Figure 8:
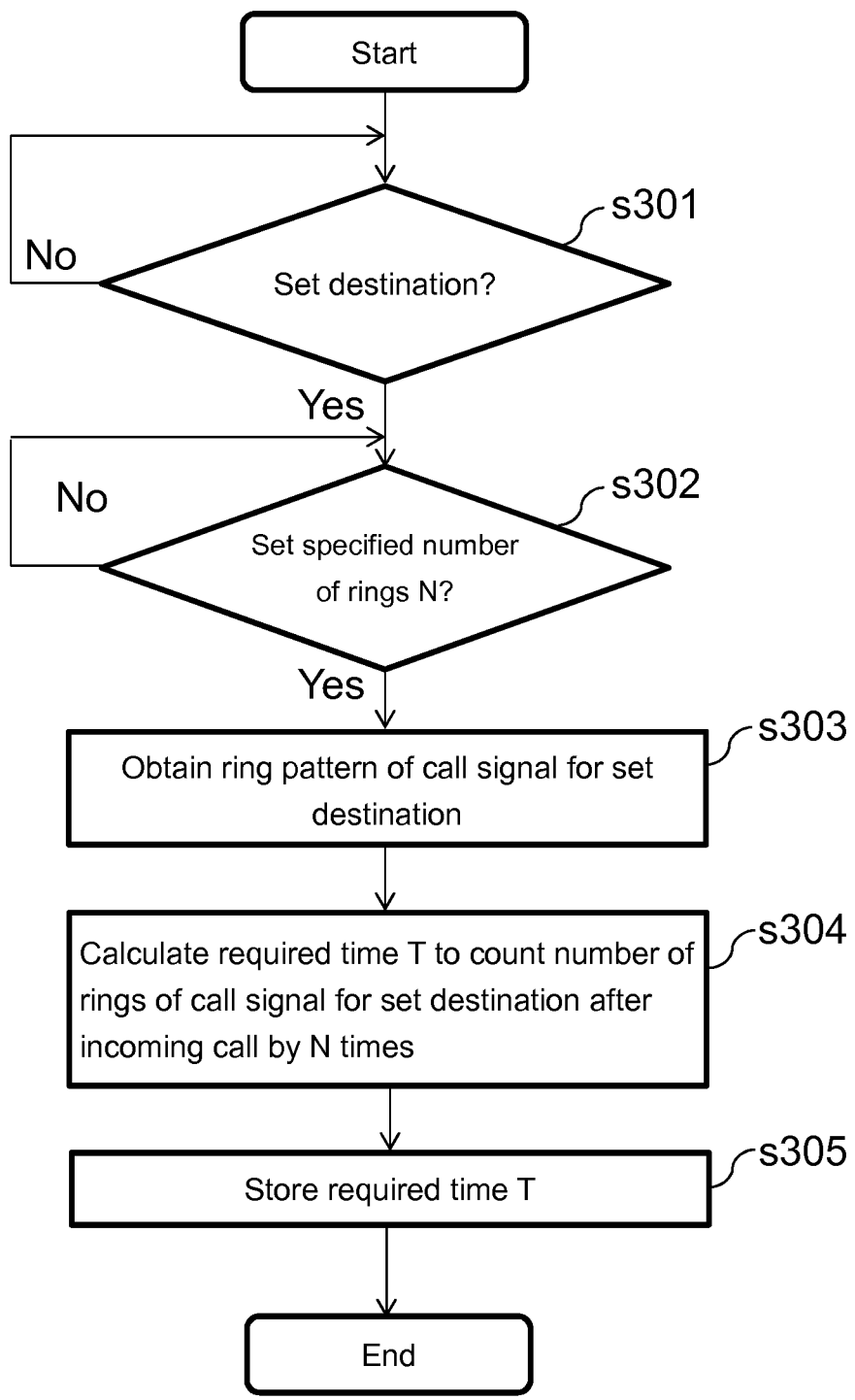
FIG. 8 illustrates a flow of processes that calculates required time at a fax board according to a third embodiment.

The following describes a flow of processes of the fax board 3 of the image forming apparatus 100 with the above-described constitution. First, with reference to FIG. 8, the following describes a flow of processes of when the main CPU 313 calculates the required time T. It is assumed that the destination and the specified number of rings N are preset to the image forming apparatus 100 at the time of delivery or similar time.

When the destination is set (Yes at Step s301), the main CPU 313 determines whether the specified number of rings N, which is the number of rings of call signal until the start of automatic reception by the facsimile, is set via the operation panel unit 10 or not (Step s302). If the specified number of rings N is not set, the main CPU 313 stands by until the specified number of rings N is set (No at Step s302). When the specified number of rings N is set (Yes at Step s302), the main CPU 313 refers to the ROM 314 and obtains the ring pattern of call signal for the set destination (Step s303).

Subsequently, the main CPU 313 calculates the required time T required to count the number of rings of call signal for the set destination by N times (specified number of rings N) (Step s304).

Figure 9:
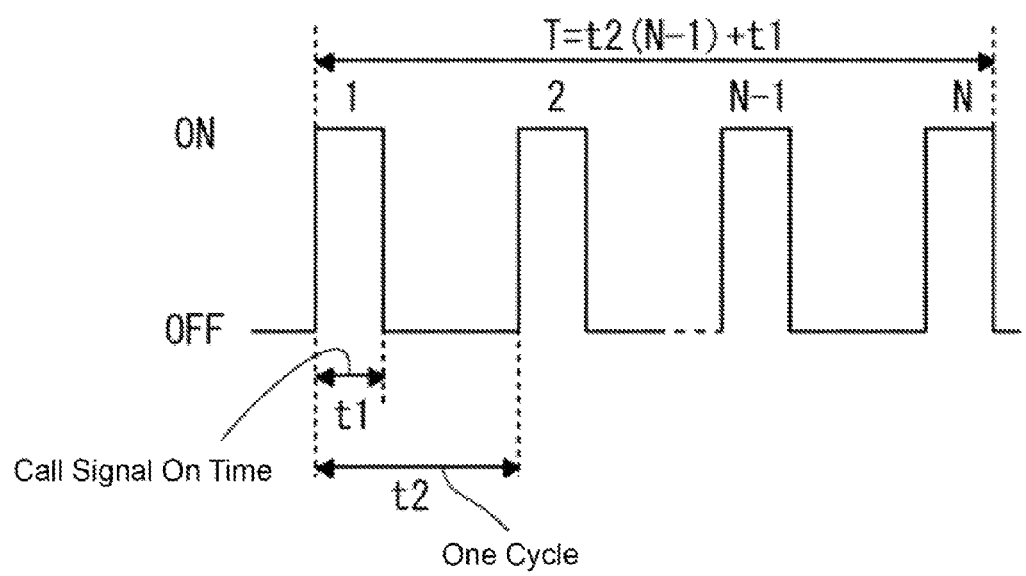
FIG. 9 illustrates the required time according to the third embodiment.

Specifically, as illustrated in FIG. 9, the main CPU 313 counts: required time $T=t2(N-1)+t1$ and obtains the required time T. Here, t1 indicates call signal on (ring) time by the one cycle of the ring pattern of call signal, t2 indicates the ring cycle of call signal, and N indicates the specified number of rings N.

For example, it is assumed that Japan is set as the destination, and the specified number of rings N is set to four times. Since the Japanese call signal has a ring pattern that turns on for one second and turns off for two seconds, required time $T=3\times(4-1)+1$. Thus, the required time $T=10$ seconds is calculated.

When the main CPU 313 calculates the required time T, the main CPU 313 causes the ROM 314 to store the required time T (Step s305), and terminates the process.

Figure 10A:
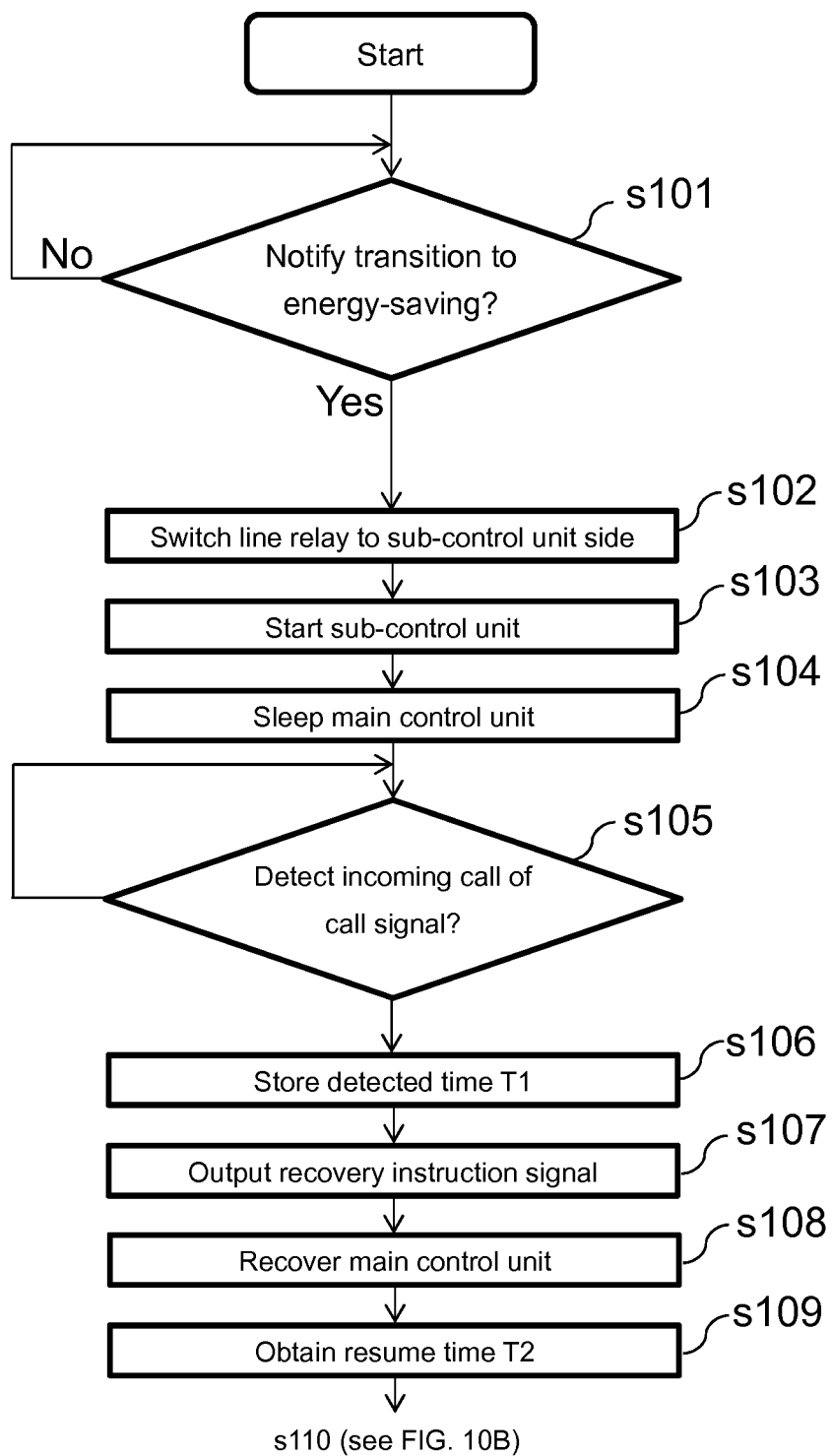
FIGS. 10A and 10B illustrate a flow of processes of when the fax board according to the third embodiment transitions from the normal mode to the energy-saving mode and then the incoming call is detected in the energy-saving mode.
Figure 10B:
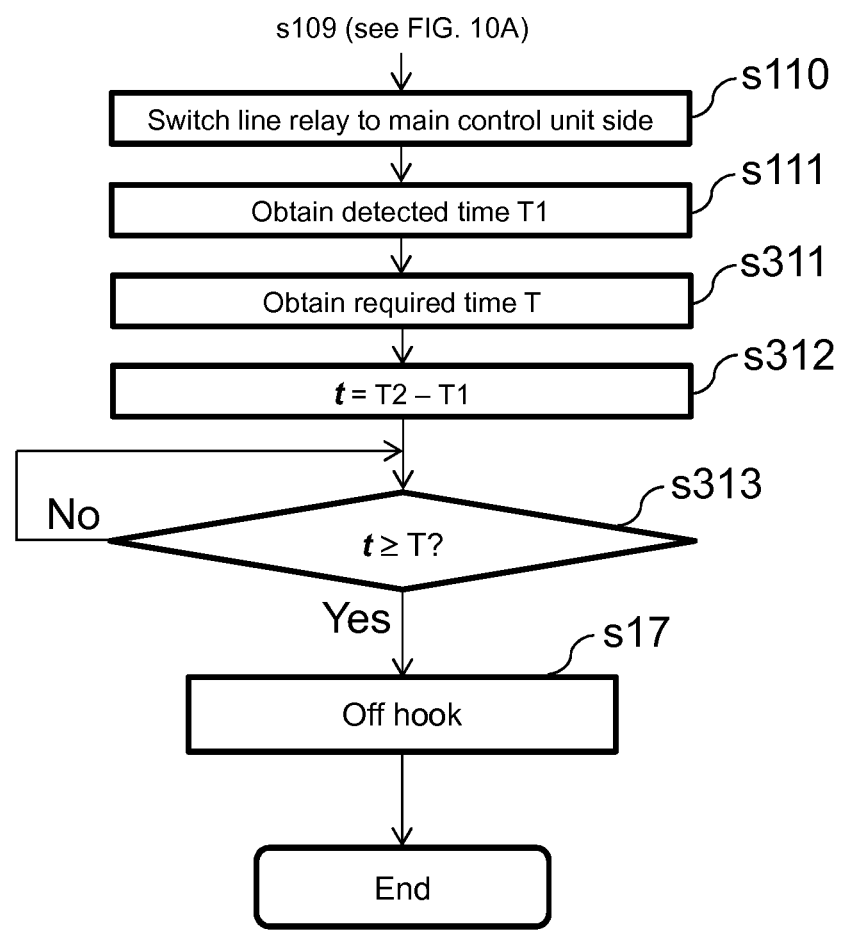

Subsequently, with reference to FIGS. 10A and 10B, the following describes a flow of processes of when the fax board 3 transitions from the normal mode to the energy-saving mode and the incoming call is detected in the energy-saving mode. Here, first, the fax board 3 is in the normal mode where the main control unit 31 starts, the sub-control unit 32 stops, and the line relay 303 has been switched to the main control unit 31 side. The following processes of Step s101 to Step s111 correspond to Step s101 to Step s111 of FIGS. 5A and 5B, respectively. Furthermore, the following process of Step s17 corresponds to Step s17 of FIG. 4.

When the incoming call detecting unit 321 detects the incoming call of call signal (Yes at Step s105), the sub-CPU 323 causes the incoming call detection information storage unit 322 to store the detected time T1 when the incoming call detecting unit 321 detects the call signal (Step s106), and outputs the recovery instruction signal to the energy-saving management unit 15 (Step s107). This recovers the main control unit 31 via the energy-saving management unit 15 and starts the main control unit 31 in the normal mode (Step s108).

The started main CPU 313 obtains the current time via the clock unit 311 and sets the current time as the resume time T2 (Step s109). Subsequently, the main CPU 313 switches the connection destination of the line relay 303 from the sub-control unit 32 side (the incoming call detecting unit 321) to the main control unit 31 side (the modem/call signal detecting unit 312) (Step s110). The main CPU 313 also obtains the detected time T1 from the sub-CPU 323 (Step s111), and obtains the required time T stored in the ROM 314 (Step s311).

Subsequently, the main CPU 313 sets T2−T1 to t, which is a timer for measuring time (Step s312), and determines whether t≥T is met or not (Step s313). That is, here, T2−T1, which is the elapsed time Y until the main control unit 31 recovers after the sub-control unit 32 detects the incoming call of call signal, is set as the initial value of the timer t, thus measurement of time is started from the elapsed time Y.

Until t≥T is met, the timer t continues measuring the time (No at Step s313). If t≥T is met (Yes at Step s313), the main CPU 313 performs the off-hook (Step s17) and terminates the process. After that, the modem/call signal detecting unit 312 starts the facsimile reception process. After that, the main CPU 313 may stop the sub-control unit 32.

The time taken from the process of Step s109 where the resume time T2 is obtained to the process of Step s313 where measurement by the timer t is performed, which are described above, is a time that is almost negligible.

The main CPU 313 may start measuring the time with the timer t from "0" and may perform the off-hook when the time where T2−T1, which is the elapsed time Y, is added to the measurement value of the timer t, reaches the required time T. That is, it is only necessary that the off-hook can be performed when the time measured with the timer based on the elapsed time Y reaches the required time T stored in the ROM 314.

By the above-described processes, this third embodiment preliminarily calculates the required time T required for the number of rings to reach the specified number of rings N after the incoming call of call signal, and the required time T is stored in the ROM 314. When the sub-control unit 32 detects the incoming call of call signal in the energy-saving mode, the timer measures the time based on the elapsed time Y. When the measurement time reaches the required time T, the off-hook is performed. When the incoming call of call signal is detected in the normal mode, the number of rings of call signal is counted. When the count value reaches the specified number of rings N, the off-hook is performed. Accordingly, this embodiment eliminates the need for locating a ring apparatus and can perform the off-hook in the time corresponding to the correct number of rings, which is the specified number of rings preset by the user or a similar person.

In this embodiment, the function of the sub-control unit 32 is simplified. This ensures configuration with low-price components, resulting in cost reduction. The external telephone set 4 is ringed with the call signal. This eliminates the need for locating the ring apparatus separately to ring the external telephone set 4, ensuring cost reduction.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A facsimile device, comprising:
a main control unit including a first main control unit having a normal mode and an energy-saving mode, the first main control unit being configured to count a number of rings in a call signal sent from a public-line network and to put the facsimile device off-hook when the count value reaches a preset specified number of rings in the normal mode, and to suspend the count and off-hook functions in the energy-saving mode; and
a sub-control unit configured to detect an incoming call signal when the main control unit is in the energy-saving mode, and cause the main control unit to recover to the normal mode; wherein
the main control unit is configured to:
calculate, after recovering to the normal mode, the number of rings in an incoming call signal in an elapsed time required from when the sub-control unit detects the incoming call signal until the main control unit recovers to the normal mode, and
use the calculated number of rings to count the number of rings in an incoming call signal.

2. The facsimile device according to claim 1, wherein:
the first main control unit is configured to calculate, as the number of rings in a call signal in the elapsed time, a maximum integer value of a value found by dividing the elapsed time by periodicity of the rings in the incoming call signal and adding 1.

3. The facsimile device according to claim 1, wherein:
the sub-control unit includes an incoming signal detection information storage unit configured to store detection clock-time when arrival of an incoming call signal is detected; and
the first main control unit is configured to set as the elapsed time a time found by subtracting the detection clock-time stored in the incoming signal detection information storage unit from a resume clock-time obtained when the first main control unit recovers to the normal mode.

4. The facsimile device according to claim 1, wherein:
the sub-control unit includes an incoming signal detection information storage unit configured to store detection clock-time when arrival of an incoming call signal is detected; and
the sub-control unit is configured to, if notified of an elapsed-time acquisition request from the main control unit, report, as the elapsed time, to the main control unit a time found by subtracting the detection clock-time stored in the incoming signal detection information storage unit from clock-time when notified of the acquisition request.

5. The facsimile device according to claim 1, wherein the sub-control unit is configured to:
measure time from detecting an incoming call signal until being notified by the main control unit of an elapsed-time acquisition request; and
report the measured time as the elapsed time to the main control unit, when having been notified by the main control unit of an elapsed time acquisition request.

6. The facsimile device according to claim 1, wherein:
the sub-control unit includes an incoming signal detection information storage unit configured to store a call signal from detecting an incoming call signal until the main control unit recovers to the normal mode; and the first main control unit is configured to calculate, as the number of rings in a call signal in the elapsed time, a number of rings in a call signal stored in the incoming signal detection information storage unit.

7. A facsimile device, comprising:
a main control unit including a second main control unit having a normal mode and an energy-saving mode, the second main control unit being configured to count a number of rings in a call signal sent from a public-line network and to put the facsimile device off-hook when the count value reaches a preset specified number of rings in the normal mode, and to suspend the count and off-hook functions in the energy-saving mode;
a sub-control unit configured to detect an incoming call signal when the main control unit is in the energy-saving mode, and cause the main control unit to recover to the normal mode; and
a storage unit configured to store a number of rings of call signal in a predetermined elapsed time required until recovery to the normal mode; wherein
the main control unit is configured to count the number of rings of call signal based on the number of rings stored in the storage unit after recovery to the normal mode.

8. The facsimile device according to claim 7, wherein:
the second main control unit is configured to calculate the number of rings of call signal in the predetermined elapsed time, the number of rings of call signal being a maximum integer value of a value found by dividing the elapsed time by a ring cycle of call signal and then adding 1, the second main control unit being configured to cause the storage unit to store the calculated number of rings.

9. A facsimile device, comprising:
a main control unit including a third main control unit having a normal mode and an energy-saving mode, the third main control unit being configured to measure a predetermined time and to put the facsimile device off-hook when the measured time reaches a required time in the normal mode, and to suspend the count and off-hook functions in the energy-saving mode;
a sub-control unit configured to detect an incoming call signal when the main control unit is in the energy-saving mode, and cause the main control unit to recover to the normal mode; and
a storage unit configured to store the required time required until a number of rings of call signal reaches a preset specified number of rings after the call signal arrives; wherein
the main control unit is configured to measure, after recovery to the normal mode, the required time based on elapsed time required until the main control unit recovers to the normal mode after the sub-control unit detects a call signal.

10. The facsimile device according to claim 9, wherein:
the third main control unit is configured to count the number of rings of call signal when the third main control unit detects incoming call of the call signal, the third main control unit being configured to put the facsimile device off-hook when the count value reaches the preset specified number of rings.

11. The facsimile device according to claim 9, wherein the main control unit is configured to:
calculate the required time by ring time of ring cycle of call signal+ring cycle×(the preset specified number of rings−1); and cause the storage unit to store the required time.

12. The facsimile device according to claim 9, wherein:
the sub-control unit includes an incoming call detection information storage unit, the incoming call detection information storage unit being configured to store detected time when the incoming call of call signal is detected; and
the third main control unit is configured to set time found by subtracting the detected time stored in the incoming call detection information storage unit from resume time obtained at recovery to the normal mode as the elapsed time.

13. The facsimile device according to claim 9, wherein:
the sub-control unit includes an incoming call detection information storage unit, the incoming call detection information storage unit being configured to store detected time when the incoming call of call signal is detected; and
the sub-control unit is configured to set time found by subtracting the detected time stored in the incoming call detection information storage unit from time when an acquisition request is notified when the main control unit notifies the acquisition request of the elapsed time as the elapsed time, the sub-control unit being configured to notify the elapsed time of the main control unit.

14. The facsimile device according to claim 9, wherein:
the sub-control unit is configured to measure time until an acquisition request of the elapsed time is notified from the main control unit after detection of incoming call of the call signal, and notify the measured time of the main control unit as the elapsed time when the main control unit notifies the acquisition request of the elapsed time of the sub-control unit.

* * * * *